United States Patent [19]
Reid

[11] Patent Number: 5,000,724
[45] Date of Patent: Mar. 19, 1991

[54] ROLLER CHAIN TENSIONING DEVICE
[76] Inventor: Rod B. Reid, 2616 Sky Dr., Missoula, Mont. 59801
[21] Appl. No.: 517,042
[22] Filed: May 1, 1990
[51] Int. Cl.$^5$ ............................................. F16H 7/08
[52] U.S. Cl. .................................. 474/111; 474/137; 474/140; 474/136
[58] Field of Search ............... 474/101, 111, 136, 137, 474/138, 140

[56] References Cited

U.S. PATENT DOCUMENTS

| | | | |
|---|---|---|---|
| 976,115 | 11/1910 | Bard | 474/135 |
| 1,163,891 | 12/1915 | Caverno | |
| 1,338,405 | 4/1920 | Stickney | |
| 1,401,169 | 12/1921 | McCuen | |
| 2,210,276 | 8/1940 | Bremer | 74/242.11 |
| 2,963,918 | 12/1960 | Blakstad | 74/242.8 |
| 3,295,383 | 1/1967 | Allen | 74/227 |
| 3,926,063 | 12/1975 | Mayfield | 74/242 |
| 3,941,006 | 3/1976 | Brodesser | 74/242.1 |
| 4,068,535 | 1/1978 | Sheets | 74/242.1 |
| 4,662,862 | 5/1987 | Matson | 474/101 |
| 4,798,562 | 1/1989 | Matson et al. | 474/101 |
| 4,832,664 | 5/1989 | Groger et al. | 474/111 |

FOREIGN PATENT DOCUMENTS

| | | | |
|---|---|---|---|
| 879105 | 7/1981 | U.S.S.R. | 474/111 |
| 742092 | 12/1955 | United Kingdom | 474/111 |

Primary Examiner—Ramon S. Britts
Assistant Examiner—Roger J. Schoeppel
Attorney, Agent, or Firm—Wells, St. John & Roberts

[57] ABSTRACT

A roller chain tensioning device includes a pair of low friction chain engaging blocks that are held selectively together by a flexible strap and fastener device. The blocks include formed surfaces for loosely receiving the side plates of the chain and for roller engagement by the chain rollers. The chain flights are received with the rollers in moving contact with the guide blocks while the chain side plates are loosley and freely received by opposed grooves, opposite to the roller engaging surfaces. The blocks are provided with opposed roller engaging surfaces of different size to facilitate operation with chains having rollers of different size. The strap and fastener enable selective adjustment of the blocks toward or away from one another thereby adjust tension along the engaged chain flights.

14 Claims, 3 Drawing Sheets

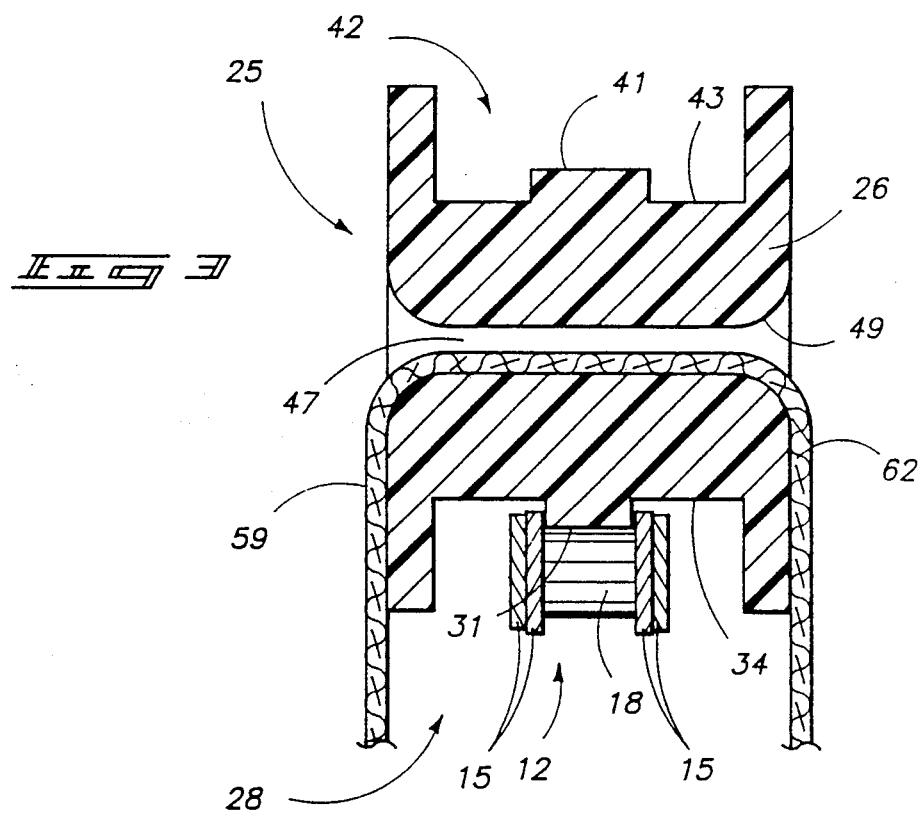
_FIG 3_
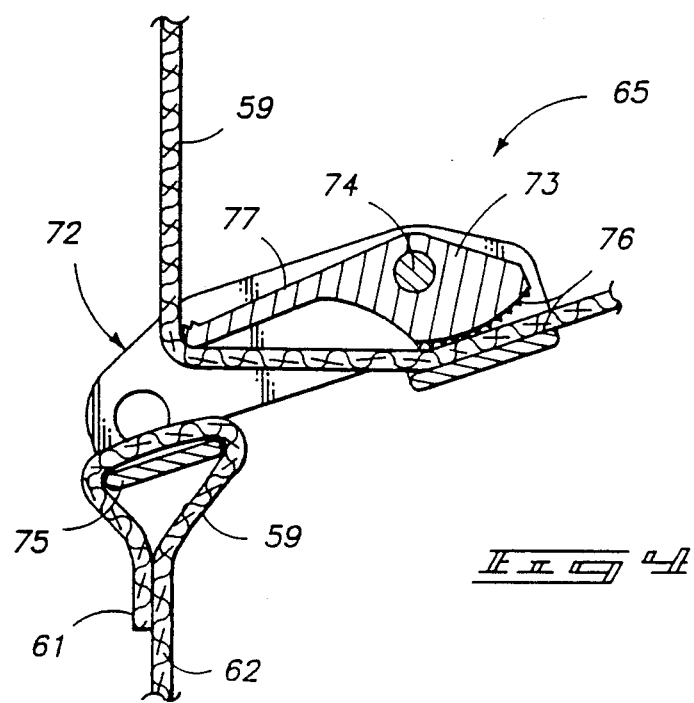
_FIG 4_ ns is not universally adaptable to all chain drive systems. One example of such a device is illustrated in U.S. Pat. No. 1,401,169 to McCuen which discloses a pivoted belt tightener. The tightener is mounted by a swing arm to a frame that is stationary relative to the moving belting flight. U.S. Pat. No. 3,295,383 to Allen discloses a drive belt tightening idler. The tightening idler is mounted by a swing arm to a frame and is urged by a spring mechanism against one of the belt flights.

ROLLER CHAIN TENSIONING DEVICE

TECHNICAL FIELD

The present invention relates to tensioning devices for opposed flights of a roller chain drive.

BACKGROUND OF THE INVENTION

Numerous devices have been developed to adjust tension along chain flights between sprockets. Most tensioning devices are mounted to support frames and include pivoted or otherwise movable chain engaging guides for engaging the chain flights and urging them together. Such apparatus, because of the requirement for a frame or other mounting device, is not universally adaptable to all chain drive systems. One example of such a device is illustrated in U.S. Pat. No. 1,401,169 to McCuen which discloses a pivoted belt tightener. The tightener is mounted by a swing arm to a frame that is stationary relative to the moving belting flight. U.S. Pat. No. 3,295,383 to Allen discloses a drive belt tightening idler. The tightening idler is mounted by a swing arm to a frame and is urged by a spring mechanism against one of the belt flights.

U.S. Pat. No. 2,963,918 to Blakstad discloses a chain or belt tensioning device. The device must be mounted to a frame separate from the chains for selective operation. Similar apparatus is shown in U.S. Pat. No. 976,115 to Bard and U.S. Pat. No. 2,210,276 to Brimer.

All the above apparatus function adequately in special applications in which framework is available to mount the tensioning device.

U.S. Pat. Nos. 1,338,405 to Stickney; 4,068,535 to Sheets; 3,941,006 to Brodesser; and 3,926,063 to Mayfield all disclose self supporting belt or chain tighteners that include rollers for engaging opposed flights of belts or chains and are adjustable toward or away from one another against opposed flights of the belts or chains. With rollers, expense is incurred in manufacturing and maintaining the roller bearings that are involved.

U.S. Pat. Nos. 4,662,862 and 4,798,562 to Matson both disclose chain tighteners with fixed friction blocks that engage the side plates of opposed chain flights. The chain side plates slide over the blocks. With such guides, excessive wear is either experienced along the guides or the roller chain side plates where they rub against the guide surfaces.

A primary object of the present invention is to provide a novel solution to the problem of tensioning roller chains by providing a roller chain tensioner with opposed roller guide surfaces that include roller engaging surfaces thereon for contacting the chain rollers, and grooves alongside the roller engaging surfaces that loosely receive the chain side plates. When engaged, the chain rollers will roll across the present roller guide surfaces and the chain side plates will move loosely through the guide grooves.

A further object is to provide such a tensioning device that is adapted to fit chains of varying size.

A still further object is to provide such a tensioning device with a simplified means by which the tensioning device may be mounted to a chain and adjusted to selectively vary tension along the flights of the chain.

These and still further objects and advantages will become apparent upon reading the following detailed description which, taken with the accompanying drawings, disclose a preferred form of the present invention.

BRIEF DESCRIPTION OF THE DRAWINGS

A preferred form of the present invention is illustrated in the accompanying drawings, in which:

FIG. 3 is a fragmented sectional view taken substantially along line 3—3 in FIG. 2; and FIG. 4 is a sectional view taken substantially along line 4—4 in FIG. 2.

DETAILED DESCRIPTION OF THE PREFERRED EMBODIMENT

The following disclosure of the invention is submitted in furtherance with the constitutional purpose of the Patent Laws "to promote the progress of science and useful arts" (Article 1, Section 8).

Figure 1:
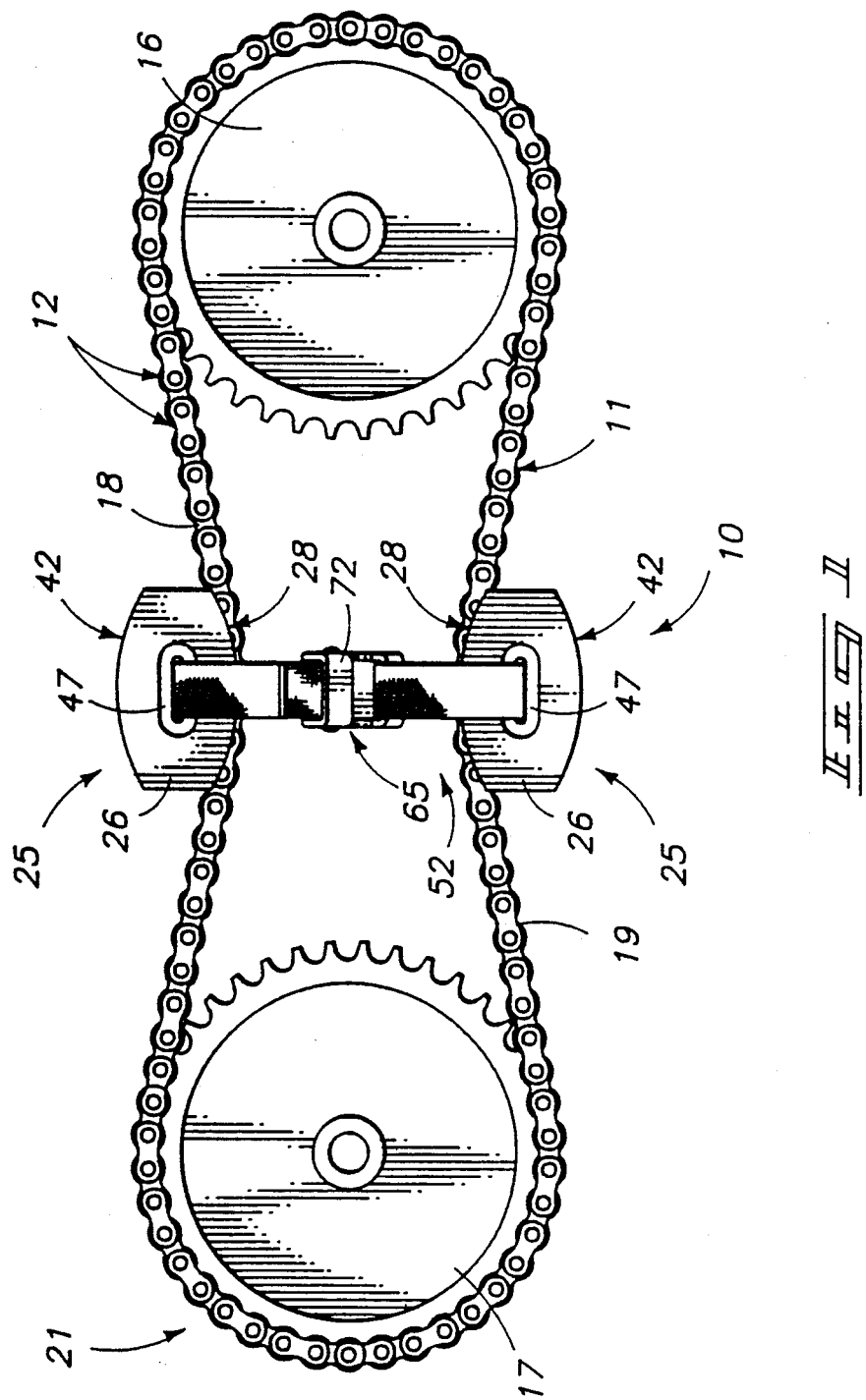
FIG. 1 is a diagrammatic view illustrating the present tensioning device on a roller chain and positioned between a pair of sprockets in a drive mechanism.
Figure 2:
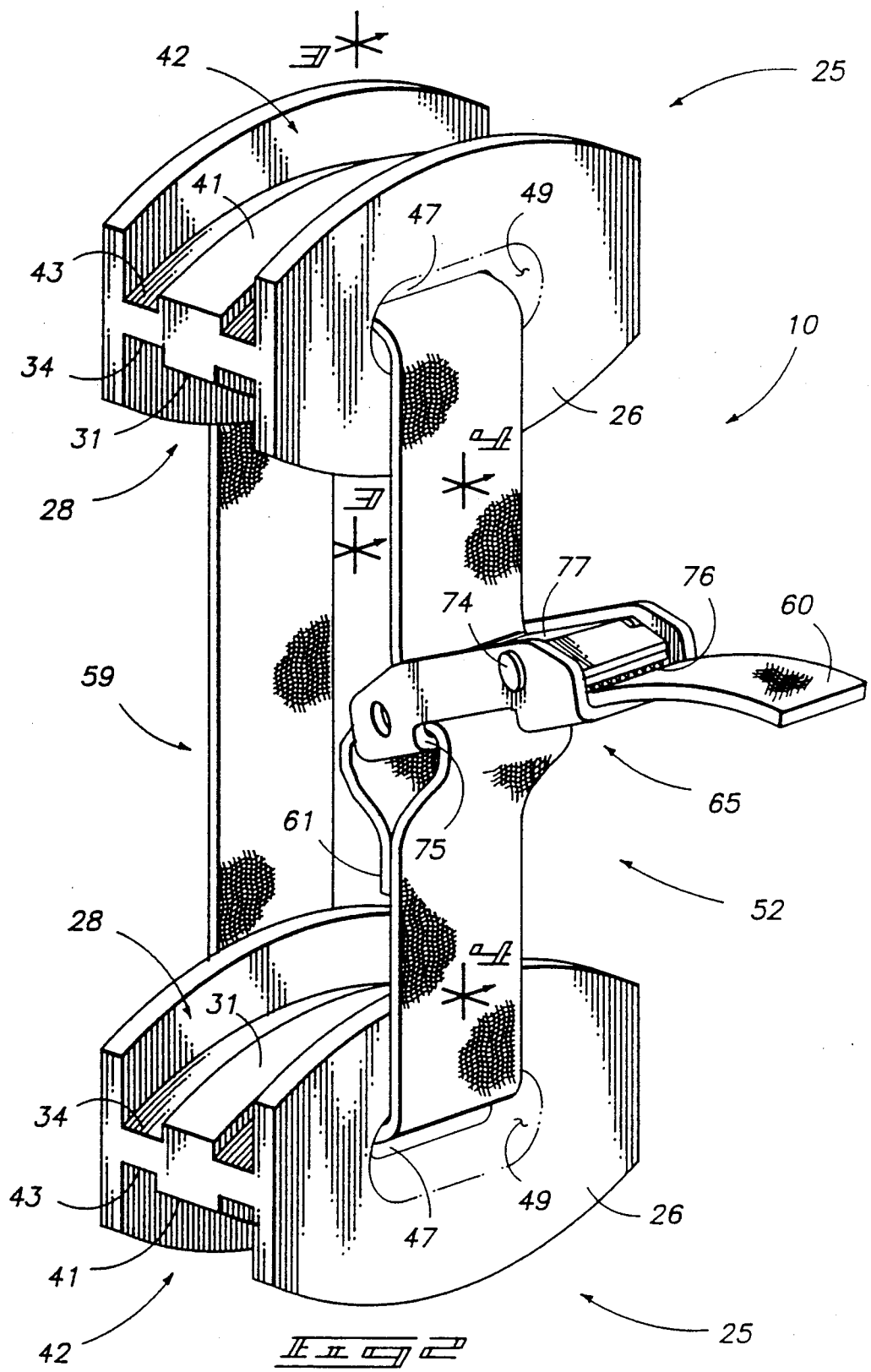
FIG. 2 is a perspective view of the present device.

The present tensioning device is illustrated at 10 in the accompanying drawings. Tensioning device 10 is provided to apply selected amounts of tension along opposed flights of roller chains 11. Such chains are comprised of links 12 formed by paired side plates 15 joined in a continuous flexible length by rollers 18. Chain 11 is typically connected in continuous loop to be trained about sprockets 16, 17 in a drive mechanism 21. Lengths of the chain extending between the sprockets 16, 17 are termed "flights", including first and second flights 19, 20, respectively. Typically one of the flights 19 or 20 is a driving flight and the remaining flight is a return flight. Tension may be applied along the length of the chain flights 19 and 20 by selectively forcing the flights toward one another as indicated in FIG. 1. The present tensioning device 10 is provided for such purpose.

The preferred tensioning device 10 includes a pair of tensioning guide blocks 25. The blocks are substantially identical to one another, each being formed preferably of a low friction coeffective plastic material as a relatively solid block body 26. Blended polyethylene material has been found suitable for this purpose.

Each preferred block body 26 includes a first convex arcuate surface 28 and an opposed second convex arcuate surface 42. The arcuate first and second surfaces 28, 42 are smooth curvatures adapted to contact the rollers along the chain flights 19, 20 in a substantially tangential manner. A first roller engaging surface 31 is provided along the first arcuate surface of each guide block 25 to receive and engage the chain rollers 18. Each of the first arcuate surfaces 28 includes a first pair of recessed side plate receiving surfaces 34. Surfaces 34 are formed into the guide block bodies along opposite sides of the first roller engaging surfaces 31.

Surfaces 34 are formed into the guide blocks to loosely receive portions of the paired chain side plates 15 of the roller chain that project laterally of the rollers 18 (FIG. 3). Thus, on each flight 19, 20, the roller chain 11 is received along the first convex arcuate surfaces 28 with chain rollers 18 rotatably engaging the first roller engaging surfaces 31 and with the adjacent chain side plates 15 loosely received within the grooves formed by the recessed side plate receiving surfaces 34.

The only substantial contact between the guide blocks and the chain, then, is the rolling tangential contact between the chain rollers 18 and the roller engaging surfaces 31. Wear along the chain and the tensioning guide blocks is therefore subtantialy minimized over prior art tensioners where the chain side walls continuously rub over surfaces of tensioner members.

The first roller engaging surfaces are found on first arcuate surfaces of the guide blocks 25. Each of the guide blocks also includes a second roller engaging surface 41 on the second arcuate surfaces 42. The second roller engaging surfaces 41 are of different dimensions than the first surfaces 31. This dimension is different to adapt the second surfaces 41 to engage and receive chains having different dimension. Second guide plate receiving recesses 43 are provided on opposite sides of the second roller engaging surfaces 41. The recesses function in the same manner discussed above in relation to the first recessed side plate receiving surfaces 34. The guide blocks need only to be selectively turned over to present either of the sized guide surfaces for engagement with a corresponding roller chain size.

The arcuate first and second surfaces 28, 42 are smooth curvatures adapted to contact the rollers along the chain flights 19, 20 in a substantially tangential manner.

Each of the tensioning guide blocks 25 includes an opening 47 extending transversely to the roller engaging surfaces 31, 41. The openings 47 are formed completely through the width dimension of the guide blocks 25. They are substantially centered along the length and height dimension of the guide blocks. The surfaces defining the openings 47 include rounded ends 49 for slidably receiving a tensioning connector 52.

The tensioning connector 52 is looped to join the guide blocks for selective adjustment toward and away from each other. Such adjustment may be accomplished with one roller engaging surface 31 or 41 on one of the guide blocks engaging chain rollers along the first flight 19, and roller engaging surface 31 or 41 on the remaining tension guide block engaging the chain rollers along the second flight 20.

The tensioning connector 52 is advantageously comprised of a strap 59 extending through the openings 47 and that is freely slidable therein. The strap is preferably comprised of woven nylon strands and extends to opposed ends 60, 61.

A fastener 65 is provided on the tensioning connector and is operable to (a) secure the tensioning connector with the guide blocks 25 positioned at a selected distance apart in order to effect a selected tension along the first and second chain flights 19, 20; and to (b) release the tensioning connector to enable the guide blocks to be separated beyond selected distance and thereby release the selected tension along the first and second roller chain flights.

The fastener 65 is advantageously comprised of frame member 72 having a cross member 75 for attachment to one end of the strap, and a gripping element 73 for receiving the remaining end and for gripping the strap at any selected point along its length in order to effect the overall size of the loop defined by the strap. The strap may be pulled through the fastener, shortening the loop, and effectively moving the guide surfaces toward one another. This results in increasing the tension along the strap and consequently pulls the guide blocks and the engaged chain flights together, thereby tensioning the chain flights. Similarly, release of the fastener 65 will have the effect of relaxing tension along the length of the strap 59 and allowing the guide blocks to separate from one another. This has a corresponding tension relaxing effect on the engaged chain flights.

A pin 74 pivotably mounts the gripping element 73 to the frame member 72 for movement about a gripping element axis. An opposed pair of gripping surfaces 76 are provided to one side of the gripping element axis. The free strap end is threaded between the gripping surfaces 76. The gripping element 73 is spring biased to pivot about the axis to bring the gripping surfaces 76 in binding relation against the engaged strap, "pinching" the strap between the gripping surfaces when tension is applied in opposite directions away from the gripping element 73 as when the strap is in tension. A lever 77 is provided on the gripping member to facilitate selective manual pivoting of the element between a gripping and releasing condition. The lever can be simply pressed to disenage the gripping surfaces, or lifted to secure the gripping surfaces together against the strap. Once the gripping surfaces are engaged, further tension along the strap simply causes the gripping elements to move closer together and more tightly grip the strap.

Installation of the present device is accomplished in a quick and easy manner. Firstly, the device is disassembled to the extent that the free end of the strap is pulled from engagement with the fastener 65. The two guide blocks may then be placed over opposed flights of a chain, with selected roller engaging surfaces 31 or 41 engaging the adjacent chain rollers 18.

The chain side plates are freely received within the adjacent recesses formed by the side plate receiving surfaces 34 or 43 so the side plates will not rub on the guide blocks when the chains are in motion. Instead, the side plates will simply move through the open grooves formed by the side plate receiving surfaces. The chain rollers, on the other hand, will roll across the engaged arcuate roller engaging surfaces 31 or 41.

Chain tension may be varied by selectively pulling the free end of the strap through the fastener until a selected tension is achieved. The strap can then be released and the fastener lever may operate manually or automatically by spring tension to secure the strap at the selected tension. Such tension may be relieved simply by pressing the lever inwardly to release the clamping force on the strap. The strap may then be pulled back through the fastener, releasing the tension along the strap and, consequently, the engaged chain flights.

A chain of a different size may be effectively tensioned by the present device simply by reversing the arcuate guide block surfaces 28, 42 and presenting the different sized roller engaging surfaces to the chain rollers. Thus, the present tensioner may be easily adapted to two or more different chain sizes.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A tensioning device for roller chains which are comprised of links formed by paired side plates joined in a continuous length by rollers and with oppositely movable first and second flights connected in a drive mechanism, the tensioning device comprising:

a pair of the tensioning guide blocks;

a roller engaging surface on each guide block for engaging the chain rollers;

the tensioning guide blocks including openings extending therethrough substantially transverse to the roller engaging surfaces;

a tensioning connector joining the guide blocks for selective adjustment toward and away from each other with one roller engaging surface on one guide block engaging chain roller along the first flight, and the roller engaging surface on the remaining tensioning guide block engaging chain rollers along the second flight;

wherein the tensioning connector is comprised of a strap extending through the openings and being freely slidable therein; and a fastener on the tensioning connector operable to (a) secure the tensioning connector with the guide blocks positioned at a selected distance apart to impart a selected tension along the first and second flights of the chain, and to (b) release the tensioning connector to enable the guide blocks to be separated beyond the selected distance and thereby release the selected tension along the first and second flights.

2. The tensioning device for roller chains as claimed by claim 1 wherein the guide blocks each include recessed side plate receiving surfaces spaced to opposite sides of the roller engaging surface and formed into the guide block to provide clearance between the chain side plates and the guide block and with the chain rollers engaging the roller engaging surface.

3. The tensioning device for roller chains as claimed by claim 1 wherein the guide blocks are formed of a low friction coefficient plastic material.

4. The tensioning device for roller chains as claimed by claim 1 wherein the guide blocks include convex arcuate surfaces and wherein the roller engaging surfaces are located on the convex arcuate surfaces.

5. The tensioning device for roller chains as claimed by claim 1 wherein:

the guide blocks each include recessed side plate receiving surfaces spaced to opposite sides of the roller engaging surface, the recessed side plate receiving surfaces being formed into the guide block to provide clearance between the chain side plates and guide block with rollers of the chain engaging the roller engaging surface; and the roller engaging surfaces and recessed side plate receiving surfaces are formed as convex arcuate surfaces on the guide blocks.

6. The tensioning device for roller chains as claimed by claim 1 wherein:

the guide blocks are formed of a low friction coefficient plastic material;

the guide blocks each include recessed side plate receiving surfaces spaced to opposite sides of the roller engaging surface, the recessed side plate receiving surfaces being formed into the guide block to provide clearance between the chain side plates and guide block with rollers of the chain engaging the roller engaging surface; and the roller engaging surfaces and recessed surfaces are formed along convex arcs on the guide blocks.

7. The tensioning device for roller chains as claimed by claim 1 wherein:

the guide blocks each include a pair of opposed convex surfaces with a first roller engaging surface on one convex surface adapted to receive a chain of a first size, and a second roller engaging surface on the remaining convex surface adapted to receive a chain of a second size.

8. The tensioning device for roller chains as claimed by claim 1 wherein the fastener is attached to one end of the strap and includes a gripping element for slidably receiving the remaining strap end and for selectively gripping the strap along its length.

9. The tensioning device for roller chains as claimed by claim 8 wherein the strap is comprised of woven nylon strands.

10. A tensioning device for roller chains which are comprised of links formed by paired side plates joined in a continuous length by rollers and with oppositely movable first and second flights connected in a drive mechanism, the tensioning device comprising:

a pair of tensioning guide blocks;

a roller engaging surface on each guide block for engaging the chain rollers;

recessed side plate receiving surfaces spaced to opposite sides of the roller engaging surface of each guide block, the recessed side plate receiving surfaces being formed into the guide block to provide clearance between the chain side plates and guide block with rollers of the chain engaging the roller engaging surface;

wherein the guide blocks each include a pair of opposed convex surfaces with a first roller engaging surface on one convex surface dimensioned to receive a chain of a first size, and a second roller engaging surface on the remaining convex surface dimensioned to receive a chain of a second size; and a tension means joining the guide blocks for selective adjustment toward and away from each other.

11. The tensioning device for roller chains as claimed by claim 10 wherein:

the guide blocks are formed of a low friction coefficient plastic material.

12. The tensioning device for roller chains as claimed by claim 10 wherein the guide blocks include convex arcuate surfaces and wherein the roller engaging surfaces are located on the convex arcuate surfaces.

13. A roller chain tensioning guide block, for roller chain comprised of links formed by paired side plates, comprising:

a guide block body;

wherein the guide block body includes a pair of opposed convex surfaces with a first roller engaging surface on one convex surface dimensioned to receive a chain of a first size, and a second roller engaging surface on the remaining convex surface dimensioned to receive a chain of a second size; and recessed side plate receiving surfaces formed into the body and spaced to opposite sides of the roller engaging surface, the recessed side plate receiving surfaces being formed into the guide block to provide clearance between the chain side plates and guide block with rollers of the chain engaging the roller 14. The roller chain tensioning guide block of claim 13 wherein:

the guide block body is formed of a low friction coefficient plastic material; and wherein the roller engaging surfaces and recessed surfaces are formed along convex arcs on the guide block body.

* * * * *